(No Model.)
S. V. GREER.
HAND CAR.
No. 302,840.  Patented July 29, 1884.
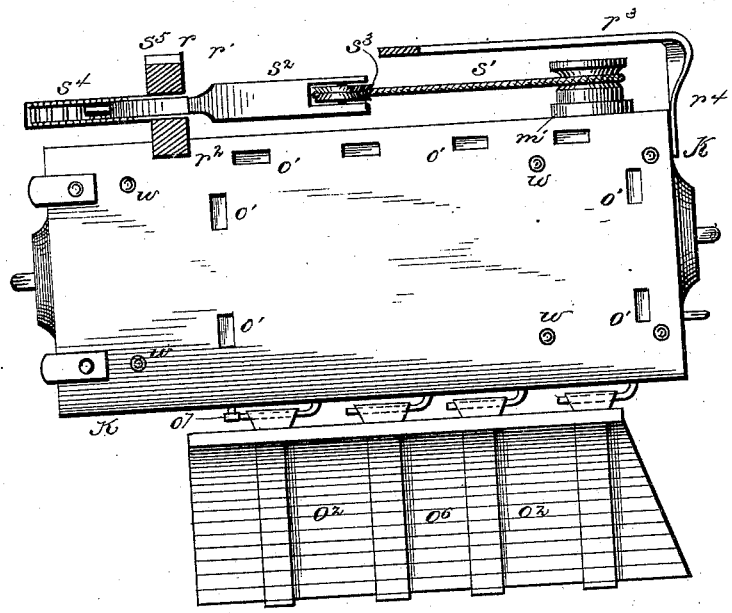
WITNESSES
Franck L. Ourand
C. J. Williamson
INVENTOR
Samuel V. Greer
By Theodore Mungen
his Attorney (No Model.) 2 Sheets—Sheet 2.
S. V. GREER.
HAND CAR.
No. 302,840. Patented July 29, 1884.
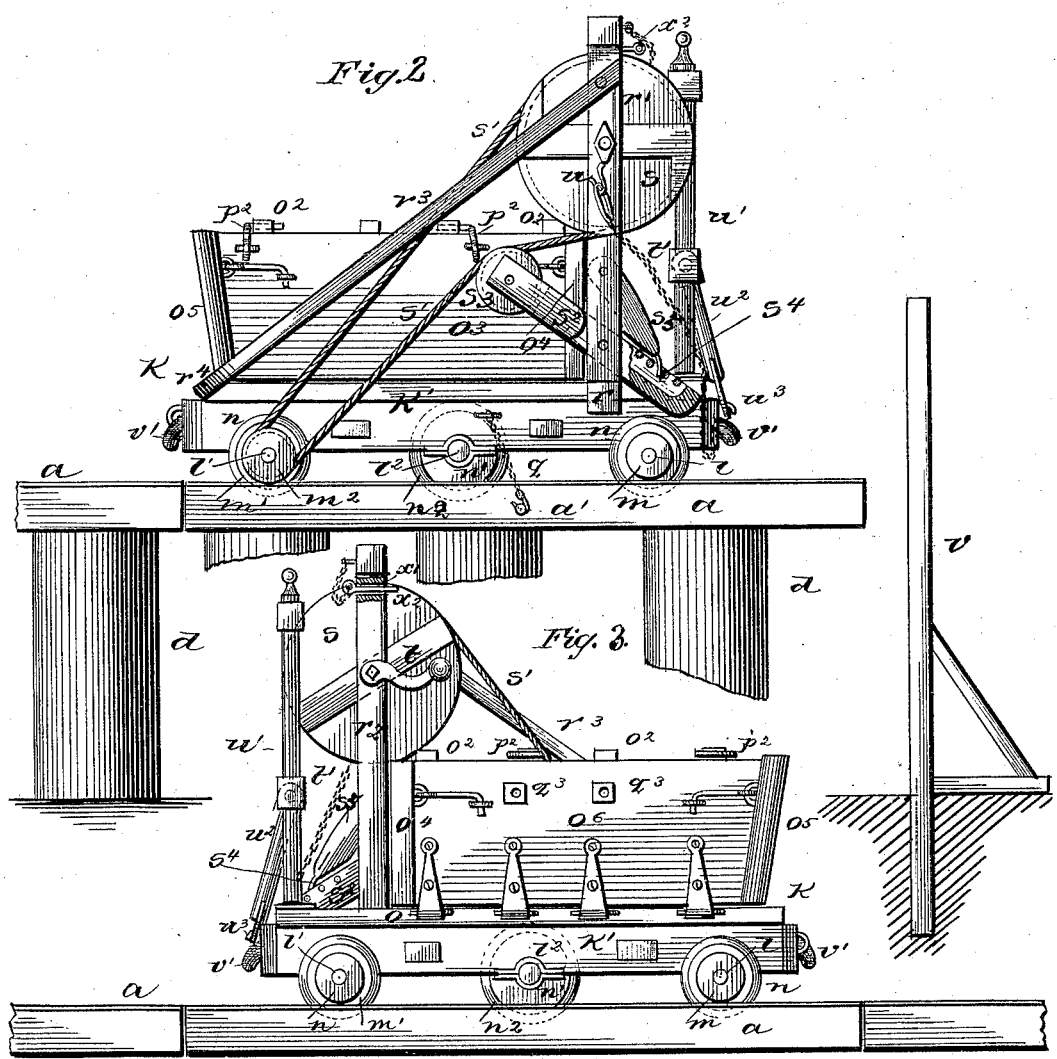

UNITED STATES PATENT OFFICE.

SAMUEL V. GREER, OF ROCKY HILL STATION, KENTUCKY.

HAND-CAR.

SPECIFICATION forming part of Letters Patent No. 302,840, dated July 29, 1884.

Application filed June 21, 1883. (No model.)

*To all whom it may concern:*

Be it known that I, SAMUEL V. GREER, a citizen of the United States of America, residing at Rocky Hill Station, in the county of Edmonson and State of Kentucky, have invented certain new and useful Improvements in Hand-Cars, of which the following is a specification, reference being had therein to the accompanying drawings.

Figure 1 is a plan view of the platform and hinged door of the hand-car. Fig. 2 is a side elevation of the hand-car, taken from the side having the belt and pulleys. Fig. 3 is an elevation from the opposite side of the hand-car. Fig. 4 is an end elevation, and Fig. 5 is a detail view.

The track upon which the hand-car is to be run may be of any desired construction, and either elevated or laid upon the ground, as may be desired.

The hand-car $k$ consists of a truck, $k'$, having three axles, $l\ l'\ l^2$, the front and rear ones, $l\ l'$, being longer than the middle one, $l^2$, and being provided with flanged wheels $m\ m\ m$ and $m'$, the wheel $m'$ having a fixed pulley, $m^2$, at its outer end, as shown. These flanged wheels $m\ m\ m$ and $m'$ are adapted to run upon the track-rails of the elevated road, and are grooved near their inner faces to receive rubber tires $n$. The middle wheels, $n'$, are grooved only, not flanged, are of larger diameter than the track-wheels, and are upon the inner sides of the longitudinal rails of the truck $k$. They are also provided with rubber tires $n^2$, the purpose of which will be hereinafter explained. The platform $o$ of the car is provided with mortises $o'$ near its rear end at one side, and also near its front end, to receive the stakes $o^2$ of the removable side-board $o^3$ and the end-gates $o^4$ and $o^5$. The remaining side-board $o^6$ is removably hinged to the platform $o$, and a set-screw, $o^7$, is employed to prevent its accidental removal from its pintles. The stakes $o^2$ of the side-boards $o^3$ and $o^6$ project above their upper edges, and hooked hinged rods $p^2$ are employed to hold them in place when the car is loaded. In hauling wood, grain in sacks, hogs, and the like, the end-gates need not be used. In hauling heavy wood for the fire-place, the hinged gate may be let down and form an incline up which the wood may be pushed. If, however, the incline should be too steep, skids may be employed. When in place, the side-boards and end-gates are connected near their corners by hooks and staples, as shown. The side of the truck opposite the hinged side-board is provided with a chain, $q$, having a hook to engage the pin in the section $a$ of the track, for the purpose of preventing the tipping of the car while loading the same. After the heavy timber has been loaded the hinged side-board should be turned up, and the forked prop $q'$ employed to hold it in place by entering the pins $q^2$ into the holes in the plates $q^3$ in the outer face of this side-board, and sinking the piked end $q^4$ into the ground until the smaller wood has been loaded, when the hooked rods $p^2$ should be hooked around the stakes and the prop removed. An arm, $r$, extends from the side of the truck-frame $k'$, and from it rise two uprights, $r'\ r^2$, connected at their upper ends by a girder. A brace, $r^3$, extends from near the top of the upright $r'$ to the front end of the truck $k'$, where it is connected through its lateral arm $r^4$.

Between the uprights $r'\ r^2$, near their upper ends, is journaled a band-wheel, $s$, from which an endless band, $s'$, runs over the fixed pulley on the flanged wheel $m'$. Between these uprights $r'\ r^2$, near their lower ends, is pivoted a lever, $s^2$, carrying at its forward end a friction-pulley, $s^3$, and having near its rear end a ratchet-slot, $s^4$, with which a pivoted detent, $s^5$, engages to regulate the tension on the endless band $s'$. The shaft of the band-wheel $s$ is provided with a removable crank, $t$, by which the motive power is imparted to the car while on the track. A chain, $t'$, is secured to the rear end of the truck for the purpose of permitting the truck to be locked to a post or other secure place when it is desired to prevent unlicensed persons from using the car. When this chain is not in use, it is hung upon a hook, $u$, at the side of the upright $r^2$. A removable frame, $u'$, is let through perforated metal plates into the platform $k'$ of the car, near its rear end, and a pivoted brace, $u^2$, engages at its lower end a stud, $u^3$, to give the frame strength. This frame $u'$ is used to push the hand-car after it has left the track and is upon the floor. By this frame $u'$, and through the media of the rubber tires upon the end and middle wheels, before referred to, the car may be turned on a curve and run over the floor or carpet without injury to them; and it may be easily and readily passed through doorways by reason of the fact that the middle wheels are the largest, and it may be tilted and guided with comparative ease. Posts $v$ are to be placed at the termini of the divisions of the track to prevent the car from running off the same, and bumpers of rubber $v'$ are provided at each end of the car-truck to deaden the shock should the car come in contact with said posts.

Having thus fully described my invention, what I claim as new, and desire to secure by Letters Patent of the United States, is—

1. A hand-car truck having the flanged wheels $m\ m\ m$ and the flanged wheel $m'$, provided with the fixed pulley $m^2$, and the wheels $n'$, located at the middle of the truck, all of said wheels being provided with rubber tires $n$ in grooves made therein, substantially as specified.

2. In a hand-car, the combination, with the platform $o$, of the removable side-board $o^3$, end-gates $o^4$ and $o^5$, the removably hinged side-board $o^6$, and the hinged hook-rods $p^2$, and corner hooks and staples, substantially as specified.

3. The combination, with the hinged side-board $o^6$ of a hand-car, of the forked prop $q'$, substantially as and for the purposes specified.

4. The combination, with a hand-car having the rubber-tired wheels $m\ m\ m\ m'$, and the larger middle wheels, $n'$, similarly tired, of the removable frame $u'$, having the pivoted brace $u^2$, engaging the stud $u^3$, substantially as specified.

5. The combination, with a car-truck having the flanged wheel $m'$, provided with the fixed pulley $m^2$, of the endless band, the band-wheel journaled in the uprights $r'\ r^2$, the friction-pulley, and the pivoted detent engaging the ratcheted slot in one end of the pivoted lever carrying the friction-pulley, substantially as specified.

In testimony whereof I affix my signature in presence of two witnesses.

SAMUEL V. GREER.

Witnesses:
BEN TURNER,
JESSEY W. PARDUE.